United States Patent
Osborn et al.

(10) Patent No.: US 7,586,224 B2
(45) Date of Patent: Sep. 8, 2009

(54) ROTATING RECTIFIER ASSEMBLY

(75) Inventors: Mark A. Osborn, Cherry Valley, IL (US); Douglas J. Turner, Rockford, IL (US); Brandon M. Grell, Cherry Valley, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 512 days.

(21) Appl. No.: 11/280,126

(22) Filed: Nov. 16, 2005

(65) Prior Publication Data
US 2007/0108854 A1  May 17, 2007

(51) Int. Cl.
*H02K 9/00* (2006.01)
(52) U.S. Cl. .................................. 310/68 D; 310/71
(58) Field of Classification Search ............... 310/68 D, 310/64, 65, 71
See application file for complete search history.

(56) References Cited

U.S. PATENT DOCUMENTS

| | | | |
|---|---|---|---|
| 3,721,843 A * | 3/1973 | Spisak et al. | ............... 310/68 D |
| 4,329,603 A | 5/1982 | Ballard | |
| 4,482,827 A | 11/1984 | Baldwin | |
| 4,581,695 A * | 4/1986 | Hoppe | ......................... 363/145 |
| 4,603,344 A | 7/1986 | Trommer | |
| 4,621,210 A | 11/1986 | Krinickas, Jr. | |
| 4,628,219 A | 12/1986 | Troscinski | |
| 4,745,315 A | 5/1988 | Terry, Jr. et al. | |
| 4,794,510 A | 12/1988 | Wege | |
| 4,806,814 A | 2/1989 | Nold | |
| 4,827,165 A | 5/1989 | Nold | |
| 4,896,062 A | 1/1990 | Pollard | |
| 5,138,210 A * | 8/1992 | Crickmore et al. | ........ 310/68 D |
| 5,319,272 A | 6/1994 | Raad | |
| 5,773,903 A | 6/1998 | McCabria et al. | |
| 5,796,196 A | 8/1998 | Johnsen et al. | |
| 6,903,470 B2 * | 6/2005 | Doherty et al. | ................ 310/59 |
| 7,166,943 B2 * | 1/2007 | Johnsen | .................... 310/68 D |
| 2003/0025109 A1 | 2/2003 | Baranda et al. | |
| 2004/0036365 A1 | 2/2004 | Doherty et al. | |

FOREIGN PATENT DOCUMENTS

GB  903434  9/1962

OTHER PUBLICATIONS

Search Report EP 06 25 4822, Aug. 12, 2006.

* cited by examiner

*Primary Examiner*—Dang D Le
(74) *Attorney, Agent, or Firm*—Carlson, Gaskey & Olds PC

(57) ABSTRACT

A rectifier assembly includes individual diodes arranged to form a full-wave bridge such that the silicon wafers of the diodes are loaded in compression. As so arranged, the centrifugal forces add to the compression forces on the diodes and on the electrical contacts therewith. The three-phase (AC) input conductors are connected by conductive straps which connect the diodes through to DC (+/−) terminal ring outputs. One surface of each of the diodes is in electrical contact with a conductive strap which then connects with the individual (AC) phases of an exciter rotor winding. The opposing surface of the diode contacts the ring diode pad on either the DC (+/−) output terminal ring. Two conductive posts, each of which are connected to only one of the DC (+/−) output terminal rings permit external connection to a main rotor winding.

22 Claims, 10 Drawing Sheets

ROTATING RECTIFIER ASSEMBLY

This invention was made with government support under Contract No.: N0019-02-C-3002. The government therefore has certain rights in this invention.

BACKGROUND OF THE INVENTION

The present invention relates to a brushless generator, and more particularly to a rectifier carried by a rotor thereof.

Full wave, three phase rectifiers are employed in a variety of environments. Depending upon the specific environment in which they are used, various requirements attend the construction of the rectifier. One application requiring somewhat unusual constraints upon the rectifier design is in so-called "brushless generators."

A typical brushless generator has three distinct generating systems, including a main generator, an exciter and a permanent magnet generator. The permanent magnet generator includes permanent magnets for establishing a magnetic field which is employed to induce current in a set of windings. This induced current is in turn employed to generate a magnetic field in the exciter; and this magnetic field in turn is employed to induce an even higher level of current, typically three phase alternating, which is then employed to generate a magnetic field for the main generator.

In a typical brushless generator construction, three phase windings forming part of the exciter are carried by the rotor. Rotor rotation results in the generation, in such windings, of a three phase signal. Such signal is then rectified to provide a source of direct current to the main field winding of the generator which is also carried by the rotor.

In many generating systems, particularly those that operate at high speeds, it is highly desirable to eliminate the brushes since they frequently require maintenance or replacement. Moreover, by their very nature, brushes may introduce transients into the electrical energy being outputted which in turn may interfere with the proper operation of some types of electrical loads being driven thereby.

A typical approach used to eliminate brushes in a generator design requires locating the magnetic field of the main generator on the rotor. Electric power is generated in the main stator and can be supplied to external loads using simple electrical conductors. With this approach, the main rotor winding must be supplied with direct current in order to generate a suitable magnetic field. Since the output of the exciter is an alternating current, this current must be rectified to direct current such that it is accordingly necessary that the rectifier interconnecting the exciter and the main generator field winding be carried by the rotor of the generator.

As the rectifier assembly is carried by the rotating shaft of the generating system, the diodes within the rectifier assembly are located in a relatively harsh environment. This environment includes: mechanical/vibration loads, hydraulic fluid flow, and temperature extremes. The harsh environment is in addition to potential handling damage of the diodes during assembly and maintenance.

Mechanical loading of the diode occurs through several factors. High centrifugal forces are generated due to the rotational speed which increase as a square of the speed. Mechanical loads also occur through differential thermal growth between the housing structure material and electrical connection material. These loads are present and cyclic over the life of the unit.

It will also be appreciated that it is highly desirable to minimize the space occupied by the rectifier assembly in order to reduce the overall size and weight of a generator. Still another desirable feature is the provision for cooling of the rectifier assembly during operation since cooling not only minimizes the possibility of thermal damage to the components, but also provides a greater capacity over a correspondingly sized, uncooled rectifier assembly.

Various conventional rotating rectifier designs locate the rectifier within the main rotor shaft to optimize packaging and electrical connections. However, increased power electromagnetic designs or packaging constraints may prevent location of the diode assembly within the shaft due to size and electrical connection limitations.

Accordingly, it is desirable to provide a compact three phase, full wave rotating rectifier assembly which mounts about the rotor shaft and meets the above stated requisites for operation within a relatively harsh environment.

SUMMARY OF THE INVENTION

A rectifier assembly according to the present invention includes individual diodes of appropriate rating arranged such that the silicon wafers of the diodes are loaded in compression. As so arranged, the centrifugal forces add to the compression forces as opposed to introducing shear forces which may deleteriously affect the diodes.

The diodes are located circumferentially about an axis of rotation and are electrically connected to form a full-wave bridge. The three-phase (AC) input conductors are connected by conductive straps which connect the diodes through to DC (+/−) terminal ring outputs. Differential thermal growth between the various rectifier components, regarding maintaining electrical contact, is accommodated by the preload or spring load bias provided by the conductive straps.

One surface of each of the diodes is in electrical contact with a conductive strap which connects with the individual (AC) phases of an exciter rotor winding. The opposing surface of the diode contacts a ring diode pad on either the DC (+/−) output terminal rings. A split housing is manufactured of a non-conductive material which electrically isolates the two output terminal rings.

Two conductive posts, each of which are connected to only one of the DC (+/−) output terminal rings permit external connection to a main rotor winding. The design is arranged such that the DC output terminal posts and the AC input posts are located on a common side of the diode housing assembly to simplify and improve the reliability of the electrical connections.

The rectifier assembly also includes a wire wound suppression resistor that is wound on a structural containment band which surrounds the diode housing assembly to resist high centrifugal forces and support the rectifier components. Coolant flow orifices within the main rotor and diode housing assembly ensure sufficient fluid cooling.

The present invention therefore provides a compact three phase, full wave rotating rectifier assembly which mounts about the rotor shaft and meets the above stated requisites for operation within a relatively harsh environment.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
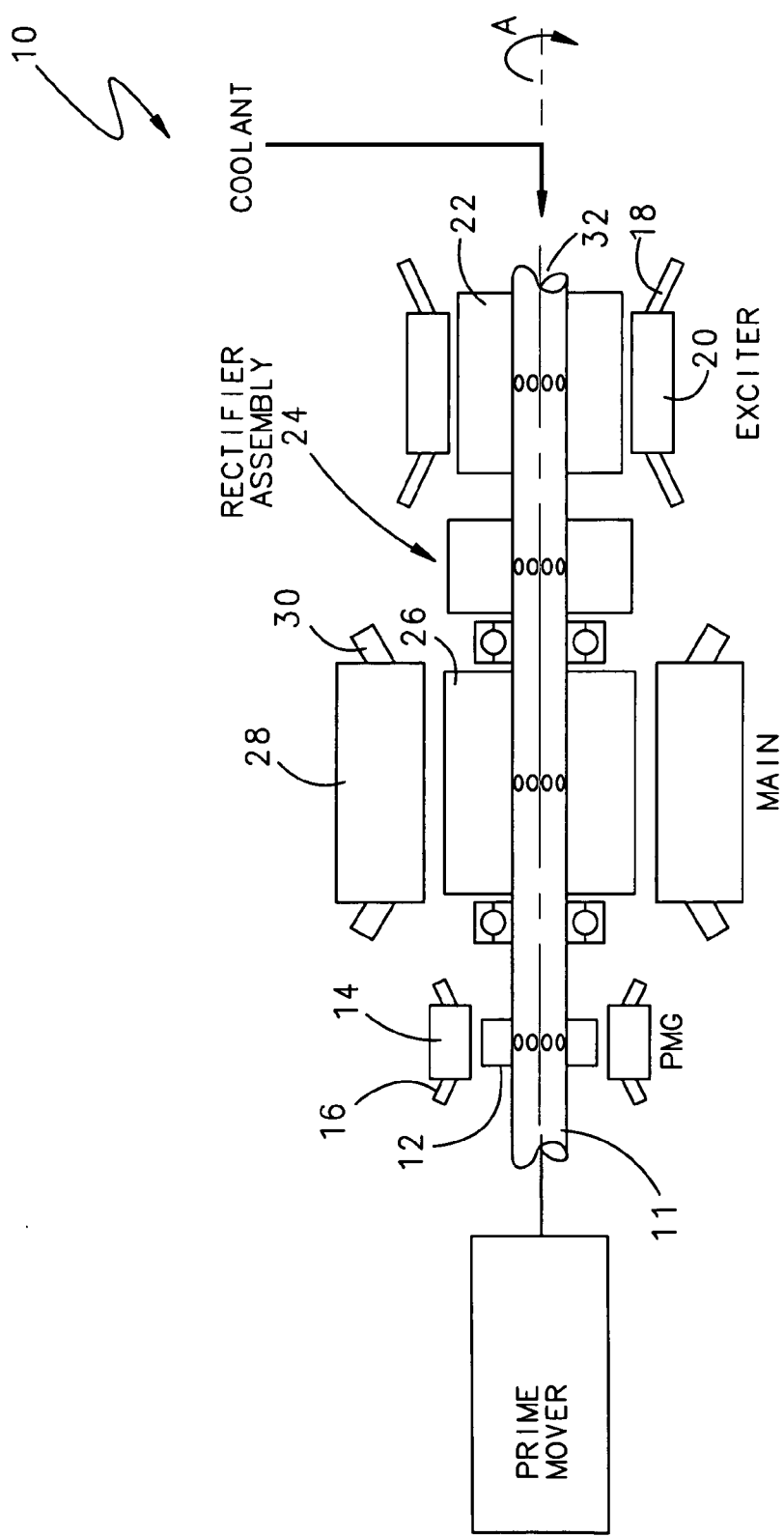
FIG. 1 is a general block diagram view of a brushless generator system for use with the present invention.

FIG. 1 illustrates a general schematic block view of a brushless generator system 10 that includes a rotor shaft 11 that is driven about an axis of rotation A by a prime mover such as a gas turbine engine. It should be understood that although the system is described in terms of a synchronous generator, it may also be utilized as a synchronous motor such as in an aircraft starter generator system. It should also be understood that although a particular component arrangement is disclosed in the illustrated embodiment, other arrangements will benefit from the invention.

The rotor shaft 11 supports a series of permanent magnets 12 thereon. A stator 14 provided with windings 16 surrounds the magnets 12 and defines a permanent magnet generator therewith. Electrical current generated in the winding 16 during rotation of the shaft 11 is sent to a controller where it then provides DC power via suitable conductors to windings 18 in an exciter stator 20. Axially aligned with the exciter stator 20 and carried by the shaft 11 are windings 22 in which current will be induced during rotation of the shaft 11.

The current induced in the windings 22 is fed to a rectifier assembly 24 mounted to the shaft 11 where it is rectified to direct current (DC), usually from a three phase alternating current supply. Direct current from the rectifier assembly 24 is then fed to a main field winding 26 carried by the shaft 11 and rotatable with a main generator stator 28. The stator 28 includes windings 30 in which an alternating current (AC) is induced and which, by suitable conductors not shown, may be connected to suitable loads.

To further increase system capacity, the shaft 11 is provided with a coolant inlet 32. A coolant such as an oil introduced into the shaft 11 is typically used for cooling the windings 16, 18, 22, 26, and 30 as well as the rectifier assembly 24. The coolant may also be utilized for other purposes such as for bearing lubrication or the like.

Figure 2:
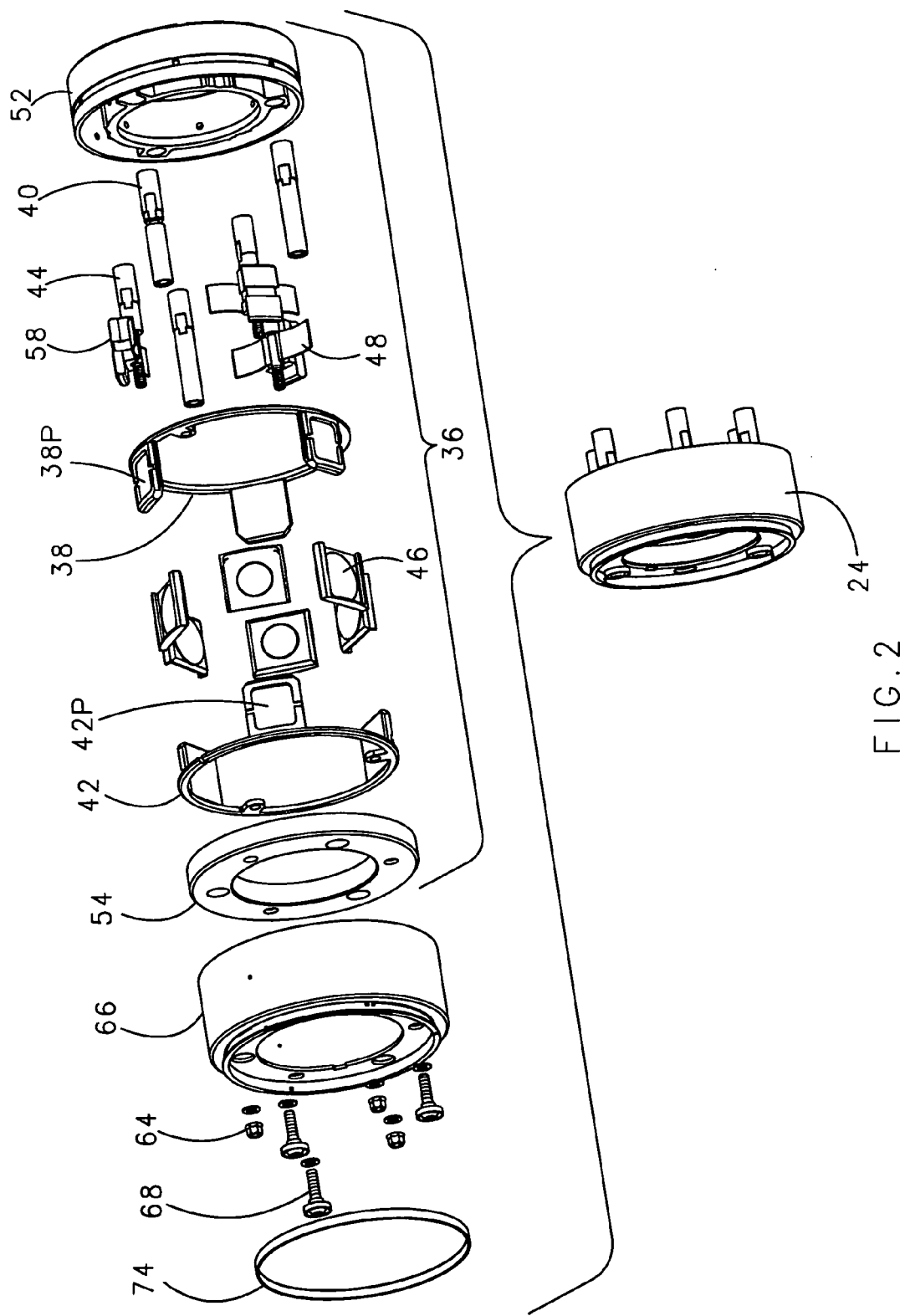
FIG. 2 is an exploded view of a rotating rectifier assembly of the present invention.

Referring to FIG. 2, the rectifier assembly 24 generally includes a housing assembly 36, a DC (+) terminal ring 38, a multiple of DC conductors 40A, 40B, 40C, a DC (−) terminal ring 42, a multiple of AC conductors 44A, 44B, 44C, a multiple of diodes 46A-46F, a multiple of conductive straps 48A, 48B, 48C and a containment band 66.

The diodes 46A-46F are located circumferentially around the rotor axis of rotation A (FIG. 1). The diodes 46A-46F are electrically connected to form a full-wave bridge (FIG. 3) such that the three phase signal from the AC power supply is rectified to provide a source of direct current to the main field winding 26 of the generator system 10 which is also carried by the shaft 11. The configuration shown is a typical three-phase, full-wave bridge rectifier. Single or multi-phase and half-wave bridge rectifier versions may be handled using the same configuration concepts.

The multiple of DC conductors 40A, 40B, 40C and the multiple of AC conductors 44A, 44B, 44C preferably include generally cylindrical posts which structurally support the rectifier components, provide electrical communication paths, as well as permit assembly of the housing assembly 36. The multiple of DC conductors 40A, 40B, 40C and the multiple of AC conductors 44A, 44B, 44C preferably include a plug or attachment assembly (FIG. 4G) at one end to electrically communicate respectively with the main field winding (DC) and the three-phase power supply (AC) from one side of the rectifier assembly 24. The opposite end of the multiple of DC conductors 40A, 40B, 40C and the multiple of AC conductors 44A, 44B, 44C preferably include threaded segments for receipt of threaded fasteners which provide for axial assembly of the housing assembly 36.

Figure 4A:
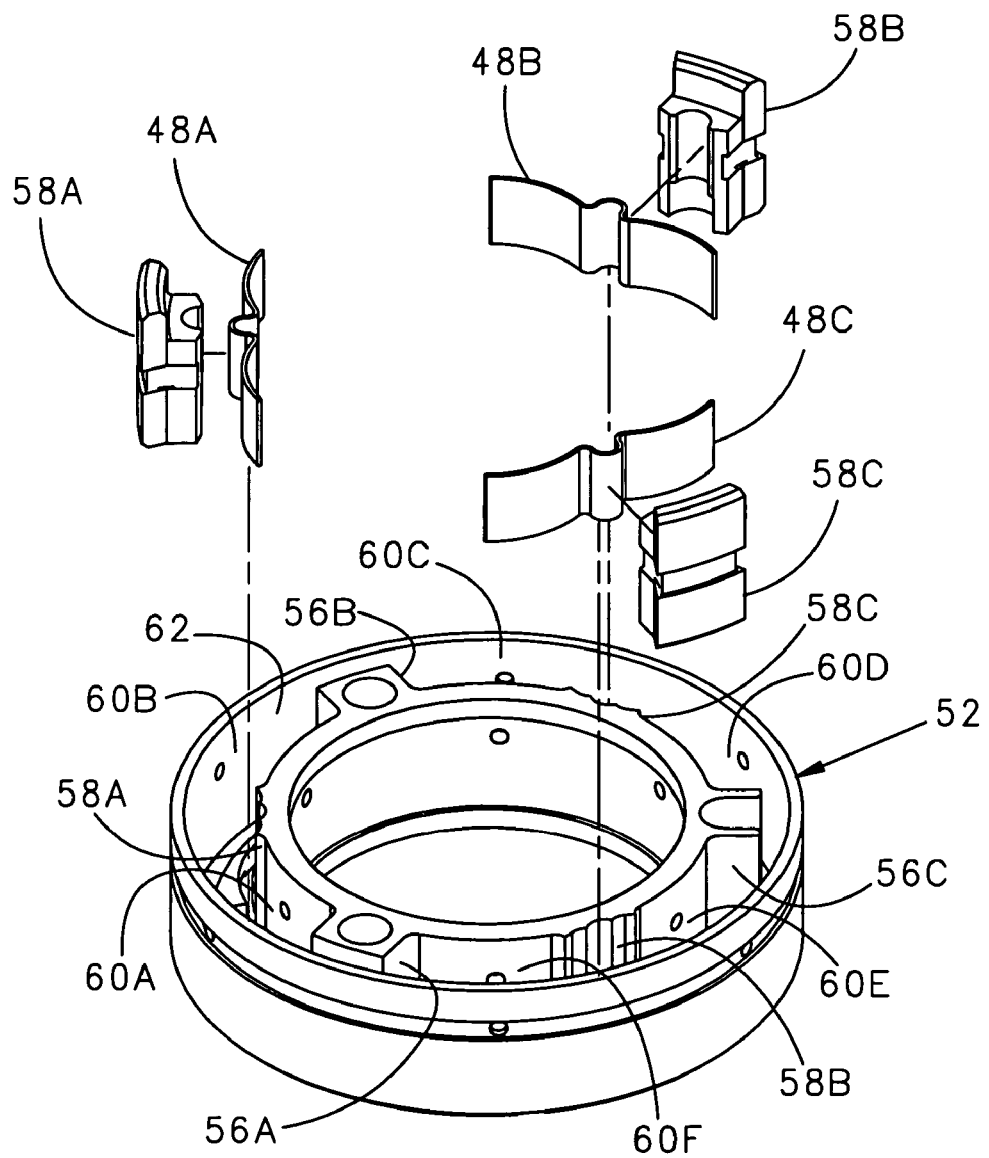
FIG. 4A is a partially assembled view of the rotating rectifier assembly.
Figure 4B:
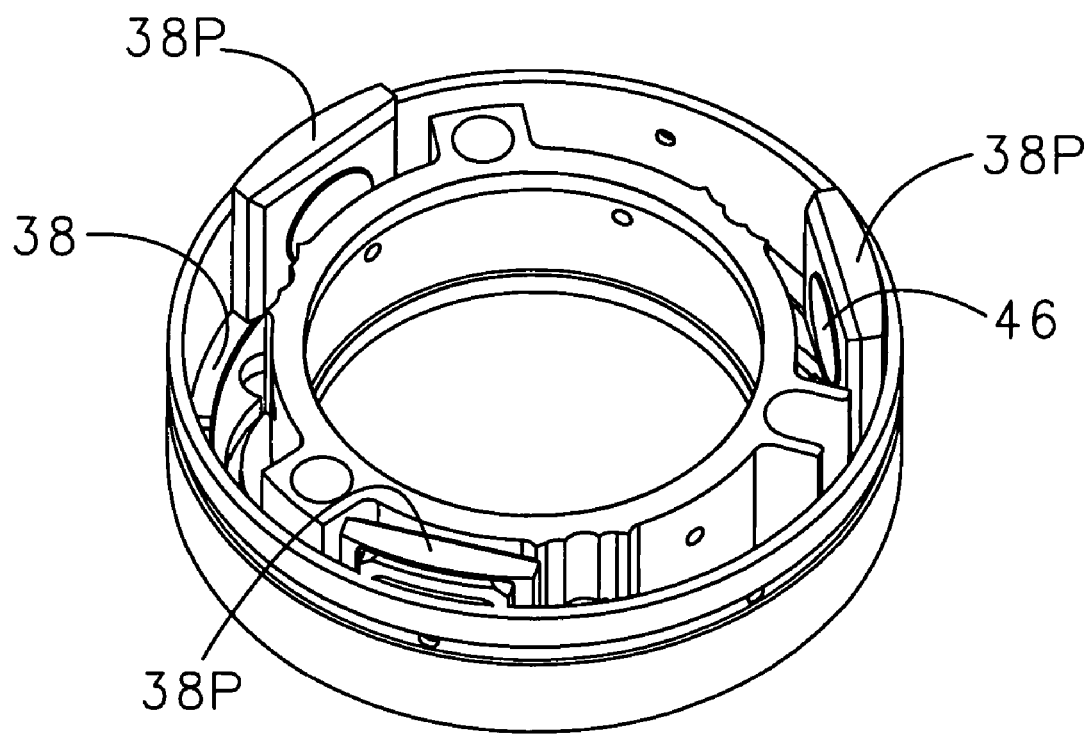
FIG. 4B is a partially assembled view of the rotating rectifier assembly with the DC (+) terminal ring mounted within a housing portion.

The housing assembly 36 preferably includes a first housing portion 52 (FIG. 4A) and a second housing portion 54 (FIG. 4E) manufactured of an electrically non-conductive material such as a Torlon plastic or the like to contain the electrically communicative rectifier components within. The housing assembly 36 is a generally annular or toroidal shape defined about the axis of rotation A such that the portions 52, 54 interface transverse to the axis A. The first housing portion 52 includes DC post supports 56A-56C and AC post supports 58A-58C which are made up of the housing and separate support pieces in an alternating arrangement adjacent an inner wall 60 of the housing portion 52. That is, the post supports are arranged in a DC, AC, DC, etc arrangement and are generally equivalently spaced to provide for rotational balance about axis A.

Between each post support 56A-56C, 58A-58C a diode space 60A-60F is formed to receive the diodes 46A-46F. The DC (+) terminal ring 38 defines a multiple of DC (+) pads 38P which extend along an outer wall 62 within alternating diode spaces 60B, 60D, 60F of the housing portion 52 while the DC (−) terminal ring 42 defines a multiple of DC (−) pads 42P which extend along the outer wall 62 within alternating diode spaces 60A, 60C, 60E of the housing portion 52. The DC (+) pads 38P extend upwards from the DC (+) terminal ring 38 located in the bottom of the housing portion 52 while the DC (−) pads 42P extend downward from the DC (−) terminal ring 42, located in the bottom of the housing portion 54. The DC (+) terminal ring attaches to one of the DC conductors and the DC (−) terminal ring attaches to two of the DC conductors, whereas one of which is used for rotational balance symmetry. That is, the DC (+) terminal ring 38 provides electric communication with three diodes and the DC (−) terminal ring provides electric communication with three diodes to the DC posts 40A-40C. It should be understood that relative positional terms such as "forward," "aft," "upper," "lower," "above," "below," "downward," "upward" and the like are with reference to the illustrations and should not be considered otherwise limiting.

Figure 3:
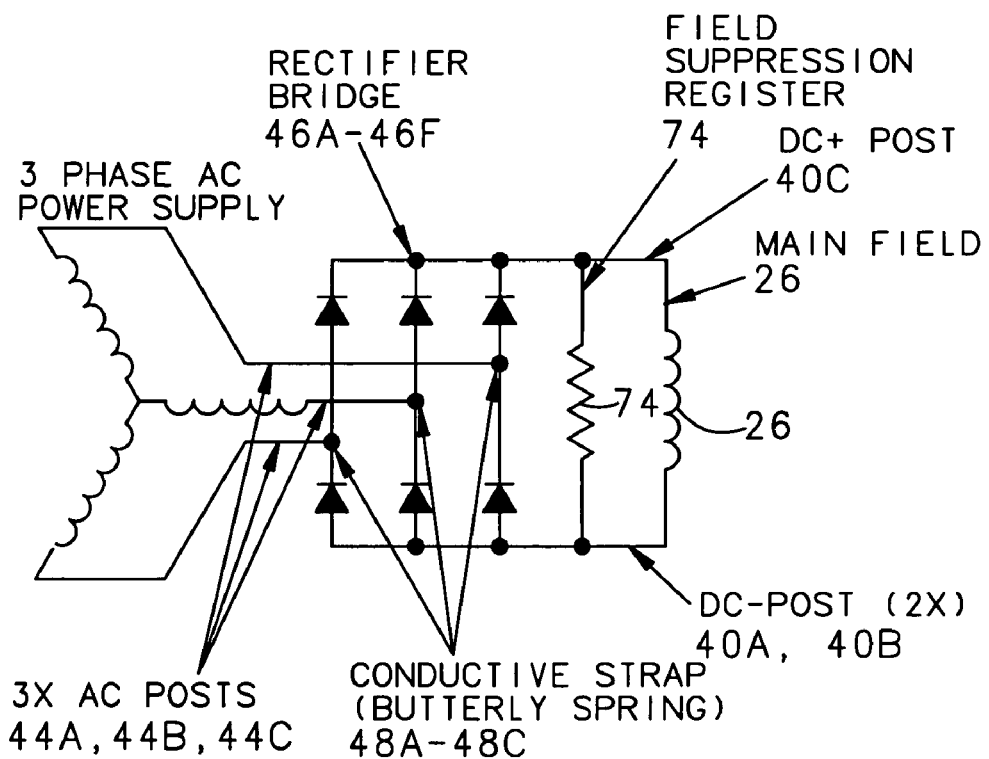
FIG. 3 is an electrical schematic of the rotating rectifier assembly illustrated in FIG. 2.

Each of the AC post supports 58A-58C, when assembled, form a circumferential slot or gap 59 (FIG. 4C) which receives one of the conductive straps 48A, 48B, 48C to electrically connect each of the multiple of AC conductor posts 44A, 44B, 44C, with an adjacent DC (+/−) pair of the multiple of diodes 46A-46F such that the diodes are electrically connected to form the full-wave bridge (also electrically illustrated in FIG. 3).

Figure 4C:
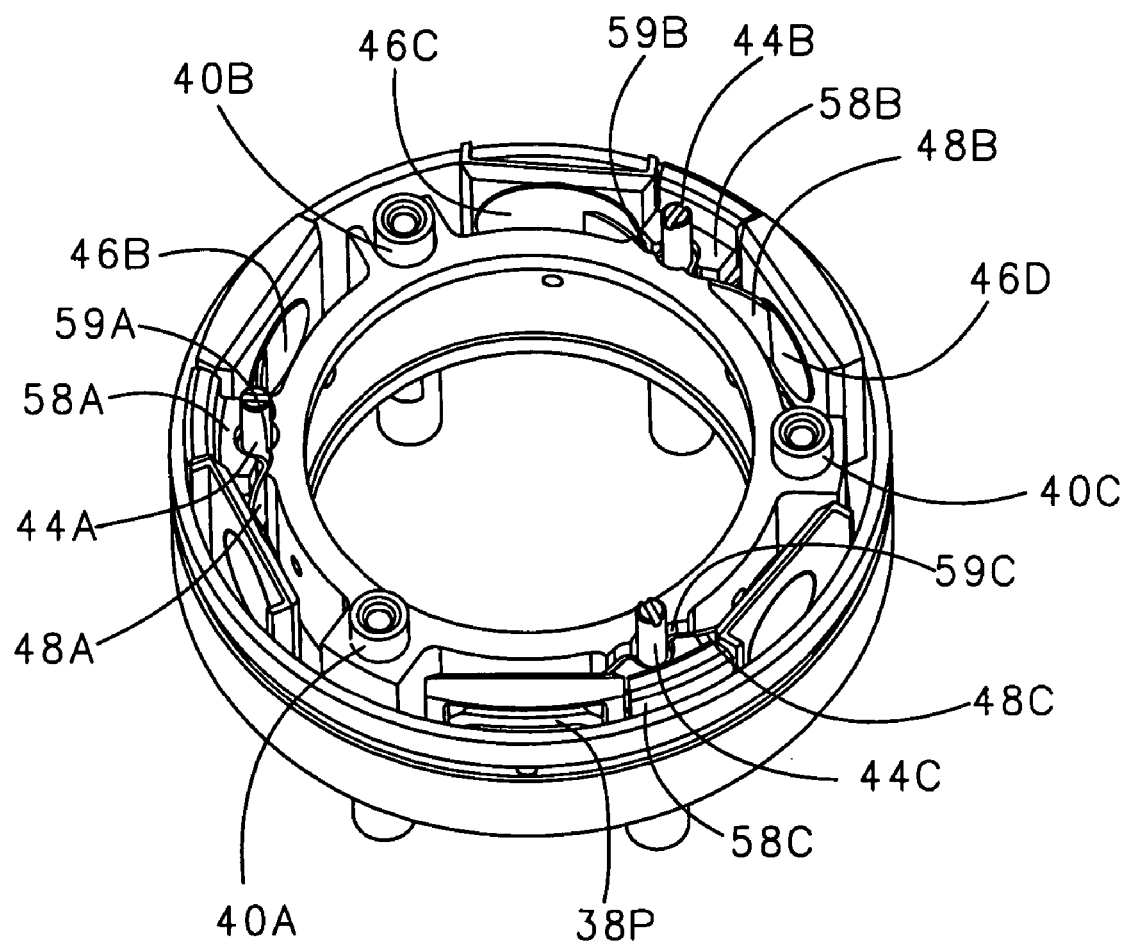
FIG. 4C is a partially assembled view of the rotating rectifier assembly with the DC (+) terminal ring, diodes, AC Contactors, DC contactors and conductive straps mounted within the housing portion.

Referring to FIG. 4C, the three-phase (AC) input AC conductor posts 44A-44C are connected by the conductive straps 48A-48C along an inner diameter of the diode 46A-46F, through the diodes 46A-46F and to the DC (+/−) terminal rings 38, 42 along an outer wall 62 of the housing portion 52. Irrespective of differential thermal growth between the various rectifier components, electrical contact is maintained by the preload or bias provided by the conductive straps 48A-48C which are preferably butterfly springs. Notably, the radial spring connection to the diodes 46A-46F has a unique characteristic in that the clamping force between the contact surfaces increases as the rotor speed increases thereby assuring electrical contact in response to increasing centrifugal forces. That is, one surface of each of the diodes electrically contacts one portion of the conductive strap which then connects with the individual (AC) phases of the exciter rotor winding. The opposing surface of each of the diode contacts the terminal ring diode pad 38P, 42P on either the (DC) (+/−) output terminal ring 38, 42.

Figure 4D:
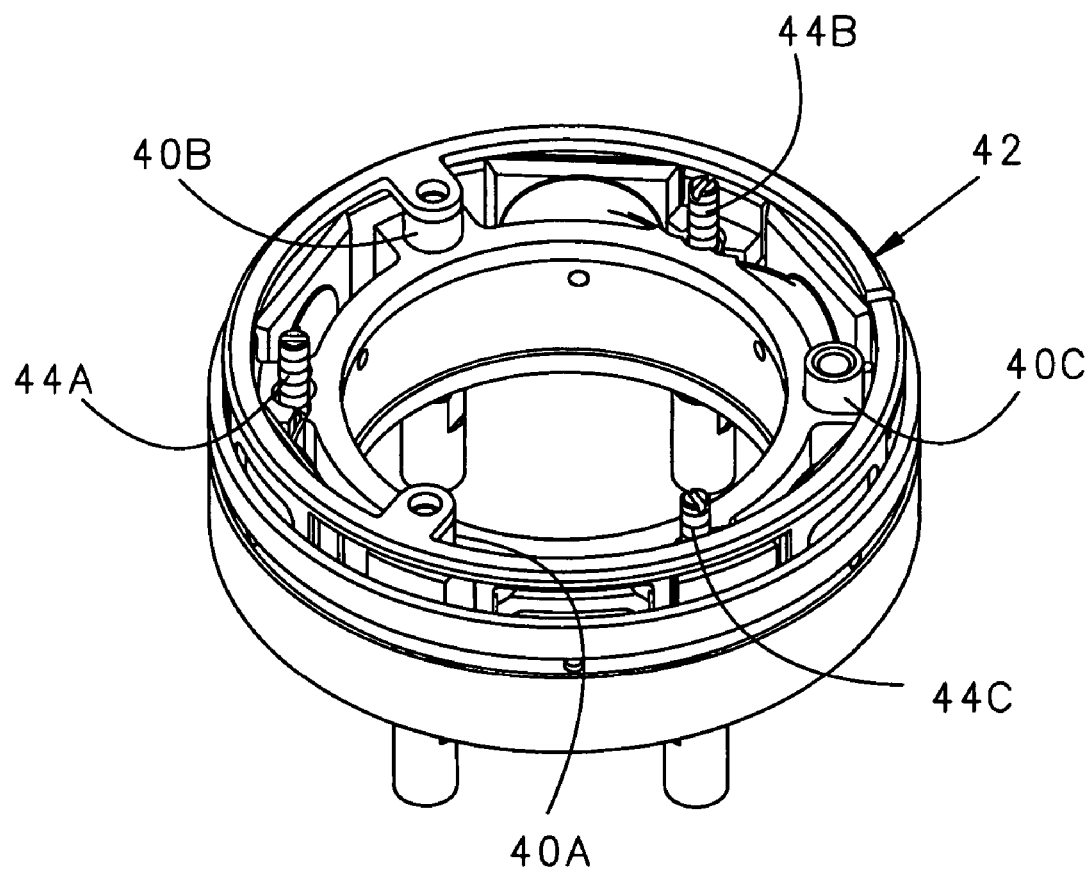
FIG. 4D is a partially assembled view of the rotating rectifier assembly with the DC (+) terminal ring, DC (−) terminal ring diodes, AC Contactors, DC contactors and conductive straps mounted within the housing portion.

Referring to FIG. 4D, the DC (−) terminal ring 42 contacts only two of the DC conductors 40A, 40B. The third DC conductor 40C is a positive DC conductor post which is in electrical contacts with the DC (+) terminal ring 38 along the bottom side thereof. Utilizing two DC conductor posts 40A, 40B as negative contacts provides redundancy and also assures that the rectifier assembly 24 is rotationally balanced during high speed rotation The DC conductors provide the DC (−) connection through the DC conductors 40A, 40B and the DC (+) connection through the DC conductor 40C to provide the direct current source to the main field winding 26 of the generator system.

Figure 4E:
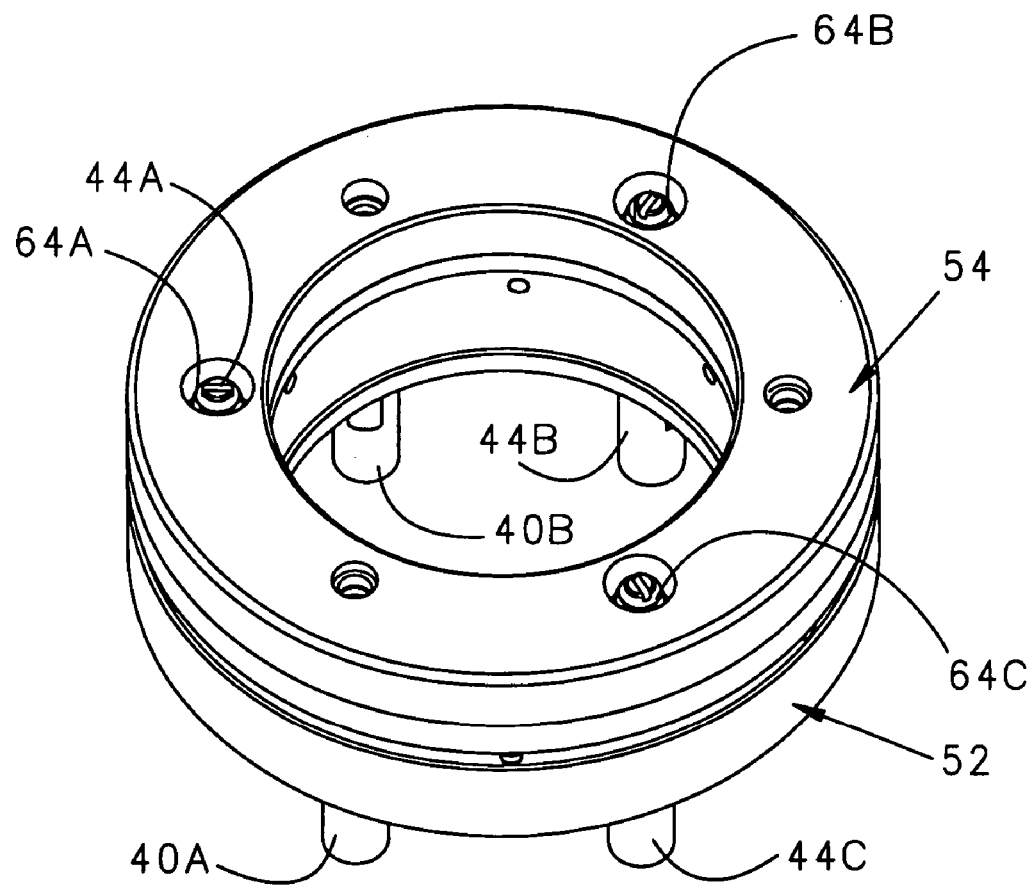
FIG. 4E is a partially assembled view of the rotating rectifier assembly with the housing assembled.

Referring to FIG. 4E, the second housing portion 54 is mounted to the first housing portion 52 through a multiple of threaded fasteners 64 such as threaded nuts. The threaded fasteners 64 mount to the AC conductor posts 44A-44C which preferably include an external thread which corresponds to the threaded fastener 64. The DC (+) terminal ring 38, the multiple of DC conductors 40A, 40B, 40C, the DC (−) terminal ring 42, the multiple of AC conductors 44A, 44B, 44C, the multiple of diodes 46A-46F, and the multiple of conductive straps 48A, 48B, 48C are thereby enclosed within the non-conductive housing assembly 36.

Figure 4F:
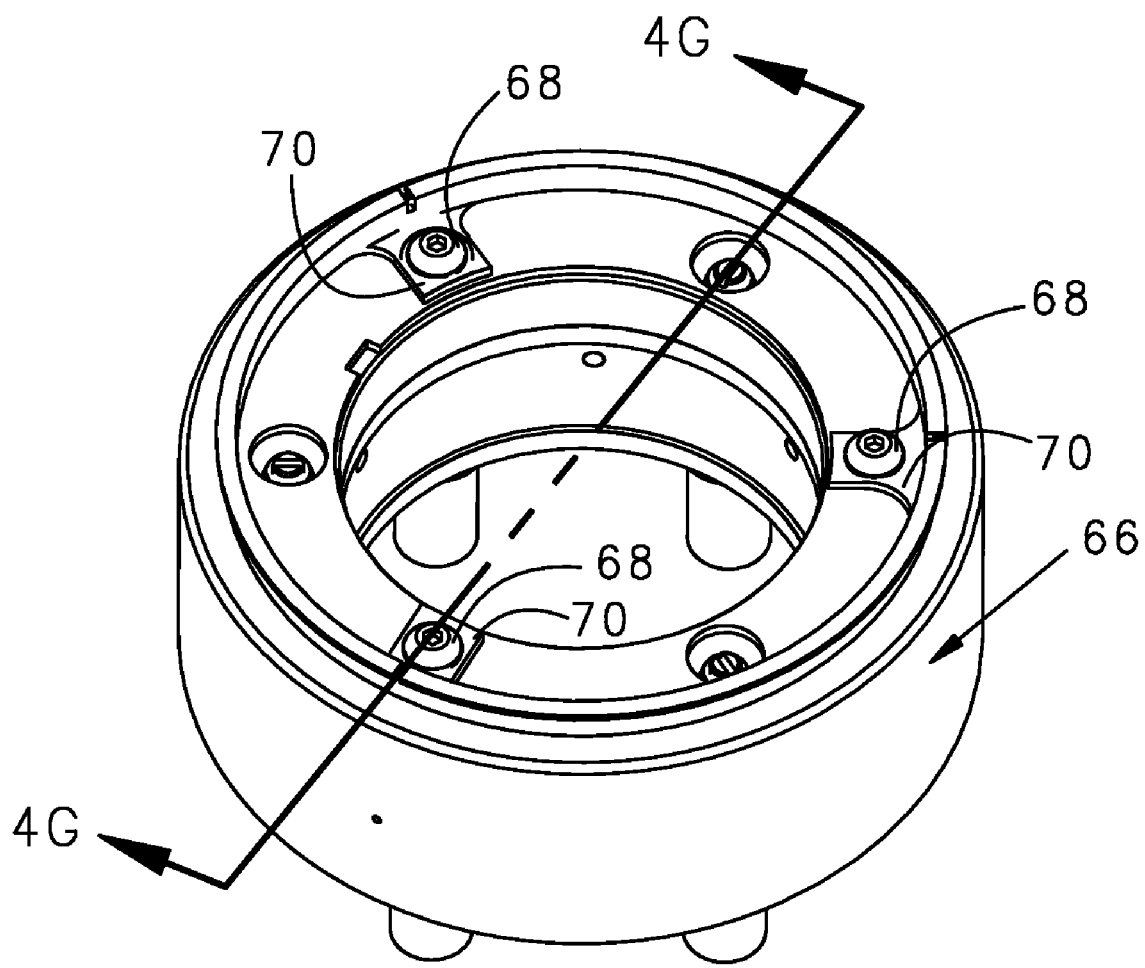
FIG. 4F is an assembled perspective view of the rotating rectifier assembly.

Referring to FIG. 4F, a containment band 66 is mounted over the housing assembly 36 to reinforce the housing assembly 36 to withstand the centrifugal forces applied to the rotating rectifier assembly 24. The containment band 66 is preferably manufactured of a high strength material such as steel or the like. The containment band 66 is mounted through a multiple of threaded fasteners 68 which pass through radial flanges 70 which extend from the containment band 66 and threadably engage the DC conductor posts 40A-40C. The DC conductor posts 40A-40C preferably include internal threads 72 which receive the threaded fasteners 68 (also illustrated in FIG. 4G).

The mechanical retention maintains the axial position of the modular components without mechanically loading the diodes 46A-46F. The diodes 46A-46F are mechanically held in place permitting electrical contact through the conductives straps 48A-48C such that contact is increased during rotation. Notably, the semi-conductive wafers which form the diodes 46A-46F are also maintained in compression. It should be understood that a solder joint could also be utilized to further provide for the electrical contact. Such assembly permits maintenance and ready access to the components contained within the housing assembly 36 without mechanically loading or direct retention of the diodes.

Figure 4G:
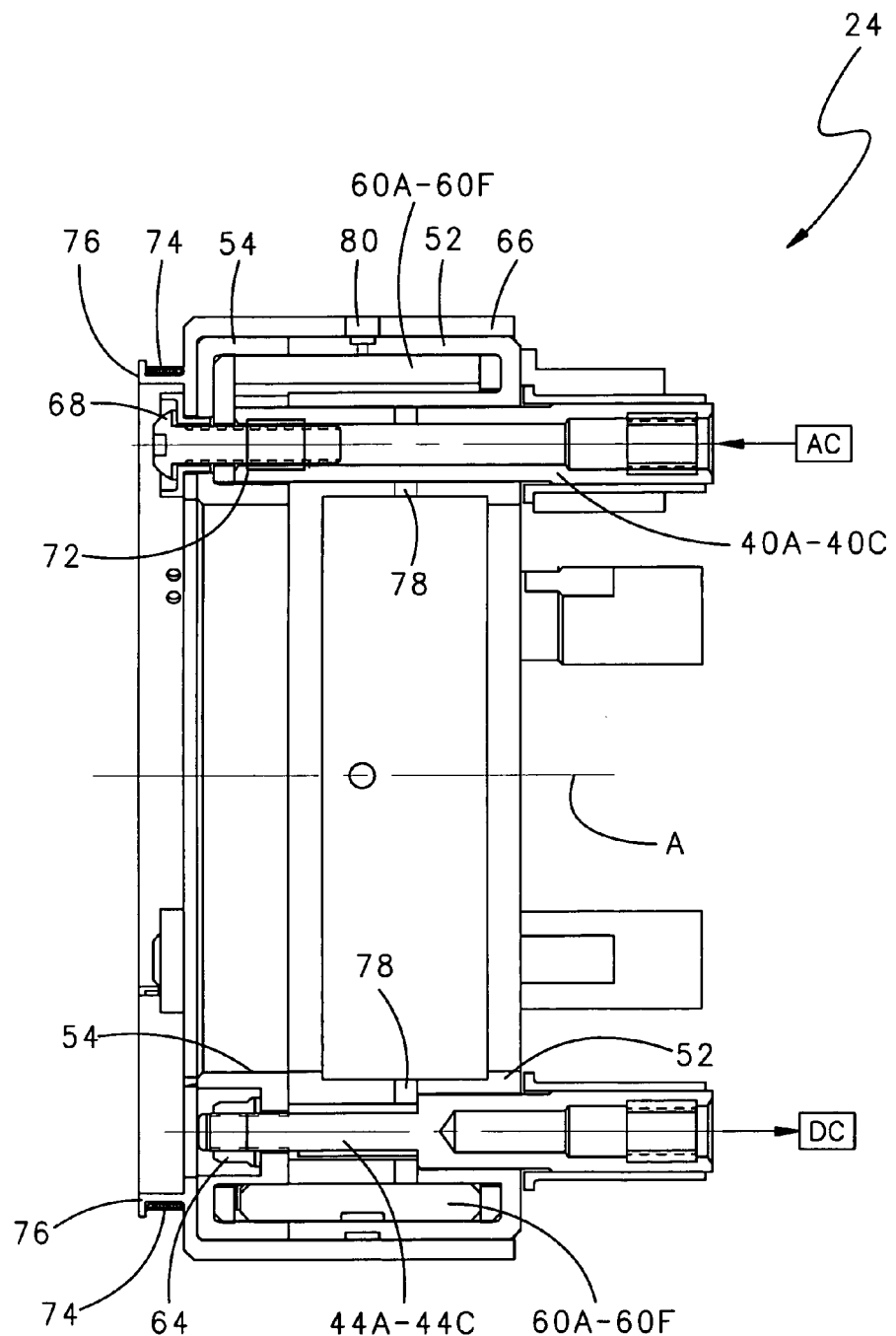
FIG. 4G is a sectional view of the rotating rectifier assembly taken along line 4G-4G of FIG. 4F.

Referring to FIG. 4G, the containment band 66 further defines a wire resistor 74 (also illustrated in the schematic of FIG. 2) which is wound about a lip 76 formed by containment band 66. The wire resistor 74 is thereby in electrical communication between a (+) and a (−) DC conductor post 40 through the containment band 66 to further smooth and condition the DC output from the generator system 10.

A multiple of coolant input apertures 78 are preferably located through the inner wall 60 of the housing assembly and a multiple of coolant exit apertures 80 are preferably located through the outer wall 62 of the housing assembly 36 and through the metal containment band 66. The multiple of coolant input apertures 78 and multiple of coolant exit apertures 80 provide a coolant flow path through the rectifier assembly 24 for coolant which is directed therein from the coolant flow within the shaft (FIG. 1). The coolant medium such as oil is preferably sprayed from within the shaft 11 through centrifugal force which also directs the coolant over the rectifier components within the housing assembly 36 and out through the multiple of coolant exit apertures 80. A coating compatible with the coolant medium may be applied over the diode chips to isolate them from contaminants. With an oil coolant, an oil resistant passivation material such as an anhydride catalyzed epoxy resin, is often suitable.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotational rectifier assembly comprising:
   a multiple of diodes circumferentially arranged about an axis of rotation, each of said multiple of diodes respectively radially biased by a biasing member into electrical contact by one of a DC conductor or an AC conductor into the other of said DC conductor or said AC conductor, each of said biasing members at least partially supported on an electrically conductive conductor post generally parallel to said axis of rotation.

2. The assembly as recited in claim 1, wherein each of said multiple of diodes define a first side facing toward said axis of rotation and a second side facing away from said axis of rotation, said first side of each of said multiple of diodes respectively radially biased into electrical contact with one of said DC conductor or said AC conductor by the other of said DC conductor or said AC conductor in electrical contact with said second side.

3. The assembly as recited in claim 1, further comprising a toroidal housing assembly which receives said multiple of diodes, said housing assembly having a first housing portion which engages with a second portion along an interface transverse to said axis of rotation.

4. The assembly as recited in claim 1, wherein said multiple of diodes are circumferentially arranged about said axis of rotation such that said first side of each of said multiple of diodes defines a generally planar face which faces toward said axis of rotation.

5. The assembly as recited in claim 1, wherein the other of said DC conductor or said AC conductor is located about an outer perimeter of said multiple of diodes relative said axis of rotation.

6. The assembly as recited in claim 1, wherein said biasing member is a conductive strap in electrical contact with an adjacent pair of said multiple of diodes.

7. The assembly as recited in claim 6, wherein said conductive strap is in electrical contact with said electrically conductive post located generally between said adjacent pair of said multiple of diodes.

8. The assembly as recited in claim 1, wherein said multiple of diodes are electrically connected to form a full-wave bridge rectifier circuit.

9. A rotational rectifier assembly comprising:
a non-conductive housing assembly defined about an axis of rotation;
a multiple of diodes circumferentially arranged within said housing about said axis of rotation, each of said multiple of diodes defining a first side facing said axis of rotation and a second side facing away from said axis of rotation;
a multiple of conductive straps radially inboard of said multiple of diodes relative said axis of rotation, each of said conductive straps in electrical contact with two of said multiple diodes;
a DC conductor in electrical contact with one of said first or second sides of each of said multiple of diodes, said DC conductor includes a DC (+) terminal ring, a DC (−) terminal ring and a multiple of DC conductor posts generally parallel to said axis of rotation, at least one of said multiple of DC conductor posts in electrical communication with said DC (+) terminal ring and at least one of sad multiple of DC conductor posts in electrical communication with said DC (−) terminal ring; and
an AC conductor in electrical contact with the other of the said first or second sides of each of said multiple of diodes, said AC conductor includes a multiple of AC conductor posts generally parallel to said axis of rotation, each of said multiple of conductive straps in electrical contact with one of said multiple of AC conductor posts.

10. The assembly as recited in claim 9, wherein said DC (+) terminal ring and said DC (−) terminal ring each include a multiple of pads, each of said pads in electrical contact with one of said multiple of diodes.

11. The assembly as recited in claim 10, wherein each of said multiple of pads are located between one of said multiple of diodes and a housing outer wall of said housing assembly.

12. The assembly as recited in claim 11, wherein each of said conductive straps in electrical contact with two of said multiple of diodes, such that one of said two diodes is in electrical contact with said DC (+) terminal ring and said other of said two diodes is in electrical contact with said DC (−) terminal ring.

13. The assembly as recited in claim 11, wherein each of said conductive straps are in electrical contact with said two of said multiple of diodes to bias said two of said multiple of diodes toward said housing outer wall.

14. The assembly as recited in claim 13, wherein each of said conductive straps include a butterfly spring.

15. The assembly as recited in claim 9, wherein each of said multiple of AC conductor posts and said multiple of DC conductor posts are circumferentially arranged about said axis of rotation.

16. The assembly as recited in claim 9, further comprising a containment band mounted about said non-conductive housing assembly.

17. The assembly as recited in claim 9, wherein said non-conductive housing assembly is a toroidal housing assembly which receives said multiple of diodes, said housing assembly having a first housing portion which engages with a second portion along an interface transverse to said axis of rotation.

18. The assembly as recited in claim 9, wherein each of said multiple of conductive straps electrically connect one of said multiple of AC conductor posts with an adjacent DC (+/−) pair of said multiple of diodes such that each adjacent DC (+/−) pair of said diodes are electrically connected to form a full-wave bridge.

19. The assembly as recited in claim 9, wherein each of said multiple of AC conductor posts are mounted to said housing post support formed within said housing assembly, said housing post support forms a circumferential gap which at least partially receives one of said multiple of conductive straps.

20. The assembly as recited in claim 9, wherein each of said multiple of DC conductor posts mounted to a housing post support formed within said housing assembly.

21. The assembly as recited in claim 9, wherein each of said multiple of AC conductor posts mounted to a housing post support formed within said housing assembly.

22. A rotational rectifier assembly comprising:
a non-conductive housing assembly defined about an axis of rotation;
a multiple of diodes circumferentially arranged within said housing assembly about said axis of rotation, each of said multiple of diodes defining a first side facing toward said axis of rotation and a second side facing away from said axis of rotation;
a multiple of conductive straps, each of said conductive straps in electrical contact with two of said multiple diodes;
a DC conductor in electrical contact with one of said first or second sides of each of said multiple of diodes, said DC conductor includes a DC (+) terminal ring, a DC (−) terminal ring and a multiple of DC conductor posts, at least one of said multiple of DC conductor posts in electrical communication with said DC (+) terminal ring and at least one of said multiple of DC conductor posts in electrical communication with said DC (−) terminal ring, said DC (+) terminal ring and said DC (−) terminal ring each include a multiple of pads, each of said multiple of pads in electrical contact with one of said multiple of diodes and located between one of said multiple of diodes and a housing outer wall of said housing assembly; and
an AC conductor in electrical contact with the other of the said first or second sides of each of said multiple of diodes, said AC conductor includes a multiple of AC conductor posts, each of said multiple of conductive straps in electrical contact with one of said multiple of AC conductor posts;
a containment band mounted about said non-conductive housing assembly; and.
a wire resistor wound about a lip formed by said containment band, said wire resistor in electrical communication between a DC (+) and a DC (−) conductor post through said containment band.

* * * * *

UNITED STATES PATENT AND TRADEMARK OFFICE
CERTIFICATE OF CORRECTION

PATENT NO.       : 7,586,224 B2                          Page 1 of 1
APPLICATION NO.  : 11/280126
DATED            : September 8, 2009
INVENTOR(S)      : Osborn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 808 days.

Signed and Sealed this

Fourteenth Day of September, 2010

David J. Kappos
*Director of the United States Patent and Trademark Office*